US009036638B2

(12) United States Patent
Banavalikar et al.

(10) Patent No.: US 9,036,638 B2
(45) Date of Patent: May 19, 2015

(54) AVOIDING UNKNOWN UNICAST FLOODS RESULTING FROM MAC ADDRESS TABLE OVERFLOWS

(75) Inventors: Bhalachandra G. Banavalikar, Cupertino, CA (US); Keshav G. Kamble, Fremont, CA (US); Abhijit P. Kumbhare, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/571,259

(22) Filed: Aug. 9, 2012

(65) Prior Publication Data

US 2014/0044130 A1 Feb. 13, 2014

(51) Int. Cl.
*H04L 12/54* (2013.01)
*H04L 12/935* (2013.01)
*H04L 12/931* (2013.01)

(52) U.S. Cl.
CPC .......... *H04L 49/3009* (2013.01); *H04L 49/351* (2013.01)

(58) Field of Classification Search
CPC ..................................................... H04L 45/38
USPC ......................................................... 370/392
See application file for complete search history.

(56) References Cited

U.S. PATENT DOCUMENTS 5,903,545 A * 5/1999 Sabourin et al. ............. 370/225
8,601,133 B1 * 12/2013 Rainovic et al. ............. 709/227
2011/0007741 A1 * 1/2011 Kreeger et al. ............... 370/389
2011/0280145 A1 11/2011 Itoh et al.
2011/0299537 A1 12/2011 Saraiya et al.
2012/0039338 A1 2/2012 Morimoto
2012/0185856 A1 * 7/2012 Ashihara et al. ............. 718/1
2013/0194964 A1 * 8/2013 Basso et al. .................. 370/254

FOREIGN PATENT DOCUMENTS

JP 2011/146982 7/2011
WO 2010/103909 A1 9/2010
WO 2011/037148 A1 3/2011

OTHER PUBLICATIONS

Gudla et al., "Experimental Demonstration of OpenFlow Control of Packet and Circuit Switches," 2010, pp. 1-3.

* cited by examiner

*Primary Examiner* — Kibrom T Hailu
*Assistant Examiner* — Kevin Cunningham
(74) *Attorney, Agent, or Firm* — Zilka-Kotab, PC

(57) ABSTRACT

In one embodiment, a system includes a processor adapted for running a switch controller application, logic configured for detecting a switch in a network, logic configured for determining that the switch is capable of communicating via the switch controller application, and logic configured for overwriting a default rule for handling unknown unicast packets in the switch such that the switch sends any unknown unicast packet received by the switch to the system instead of flooding when an unknown unicast packet is received. In another embodiment, a method includes detecting a switch in a network, determining that the switch is capable of communicating via a switch controller application, and overwriting a default rule for handling unknown unicast packets in the switch such that the switch sends any unknown unicast packet received by the switch to the switch controller instead of flooding when an unknown unicast packet is received.

19 Claims, 9 Drawing Sheets

AVOIDING UNKNOWN UNICAST FLOODS RESULTING FROM MAC ADDRESS TABLE OVERFLOWS

BACKGROUND

The present invention relates to data center infrastructure, and more particularly, this invention relates to improving fabric bandwidth utilization by avoiding unknown unicast floods resulting from switch MAC address table overflows.

In packet-switched network switches, look-up is typically performed on a destination media access control (MAC) address to discover an actual destination port of a switching device for forwarding the packet. This look-up is performed on a MAC address learning table. Most systems utilize a switching processor of some kind, such as an application specific integrated circuit (ASIC), for this determination. The switching processor maintains the look-up table(s) for performing the look-up resolution, which in typical networks may be rather long, possibly having thousands of entries. The look-up table(s) are either stored on chip or stored external to the chip.

When a switch's MAC address table becomes full, there is no capacity for learning new MAC address entries, even though new, unknown MAC addresses may be discovered by the switch during packet processing. In this case, when a unicast packet arrives with a destination MAC that is not in the MAC address table, the switch may neither "learn" the MAC address from the incoming packet nor is the switch capable of determining which port to forward the incoming packet to since the MAC address is not associated with an egress port of the switch.

In order to account for this situation, currently, default behavior of the switch is to create an unknown unicast flood (unicast packet sent to multiple ports) on all of the egress ports (excluding the incoming port on which the packet was received) as if the unicast flood was a broadcast packet (a multicast packet). In between the time that the unicast flood is sent and a response is received, it is necessary for one or more MAC address entries in the MAC address table to age out in order for the response from a device having the destination MAC address to allow the switch to "learn" the responding device's MAC address by creating a MAC address/switch port association for future forwarding reference. If the MAC address table remains full (i.e., no existing MAC address entries age out during the response interval) then the same problem persists and broadcast of the unknown unicast floods the fabric again and again.

There are two problems with this default switch behavior. First, this behavior consumes critical resources, such as fabric bandwidth, and second, this behavior may cause security problems where unintended hosts receive sensitive traffic (in the form of the unicast flood).

Accordingly, it would be beneficial to have a system and/or method capable of solving the problem of receiving a packet having unknown MAC address without producing a unicast flood.

SUMMARY

In one embodiment, a system includes a processor, implemented in hardware, adapted for running a switch controller application, logic configured for detecting a switch in a network, logic configured for determining that the switch is capable of communicating via the switch controller application, and logic configured for overwriting a default rule for handling unknown unicast packets in the switch such that the switch sends any unknown unicast packet received by the switch to the system instead of flooding when an unknown unicast packet is received.

According to another embodiment, a computer program product for handling unknown unicast packets includes a computer readable storage medium having computer readable program code embodied therewith, the computer readable program code including computer readable program code configured for detecting a switch in a network, computer readable program code configured for determining that the switch is capable of communicating via a switch controller application, and computer readable program code configured for overwriting a default rule for handling unknown unicast packets in the switch such that the switch sends any unknown unicast packet received by the switch to a switch controller instead of flooding when an unknown unicast packet is received, wherein the switch controller is capable of miming the switch controller application and communicating with the switch.

In yet another embodiment, a method for handling unknown unicast packets includes detecting a switch in a network that includes the switch and a switch controller, determining that the switch is capable of communicating via a switch controller application, and overwriting a default rule for handling unknown unicast packets in the switch such that the switch sends any unknown unicast packet received by the switch to the switch controller instead of flooding when an unknown unicast packet is received.

According to another embodiment, a switch includes a processor, implemented in hardware, adapted for running an OpenFlow application, logic configured for allowing an OpenFlow controller to overwrite a default rule for handling unknown unicast packets in the switch such that the switch sends any unknown unicast packet received by the switch to the OpenFlow controller instead of flooding when an unknown unicast packet is received, logic configured for receiving an unknown unicast packet, logic configured for determining when a local media access control (MAC) address table is full, logic configured for learning a source MAC address associated with the packet when the local MAC address is not full, logic configured for preparing a source MAC ingress port association entry and sending the source MAC ingress port association entry to the OpenFlow controller when the local MAC address is full, logic configured for determining when a destination MAC address associated with the packet is in the local MAC address table, logic configured for forwarding the packet according to the destination MAC address when the destination MAC address associated with the packet is in the local MAC address table, and logic configured for either forwarding the packet according to a destination MAC address associated with the packet that is stored in the extended MAC address table or broadcasting the packet, wherein the destination MAC address associated with the packet that is stored in the extended MAC address table is received from the OpenFlow controller when an entry having the destination MAC address is in the extended MAC address table.

Other aspects and embodiments of the present invention will become apparent from the following detailed description, which, when taken in conjunction with the drawings, illustrate by way of example the principles of the invention.

DETAILED DESCRIPTION

Figure 1:
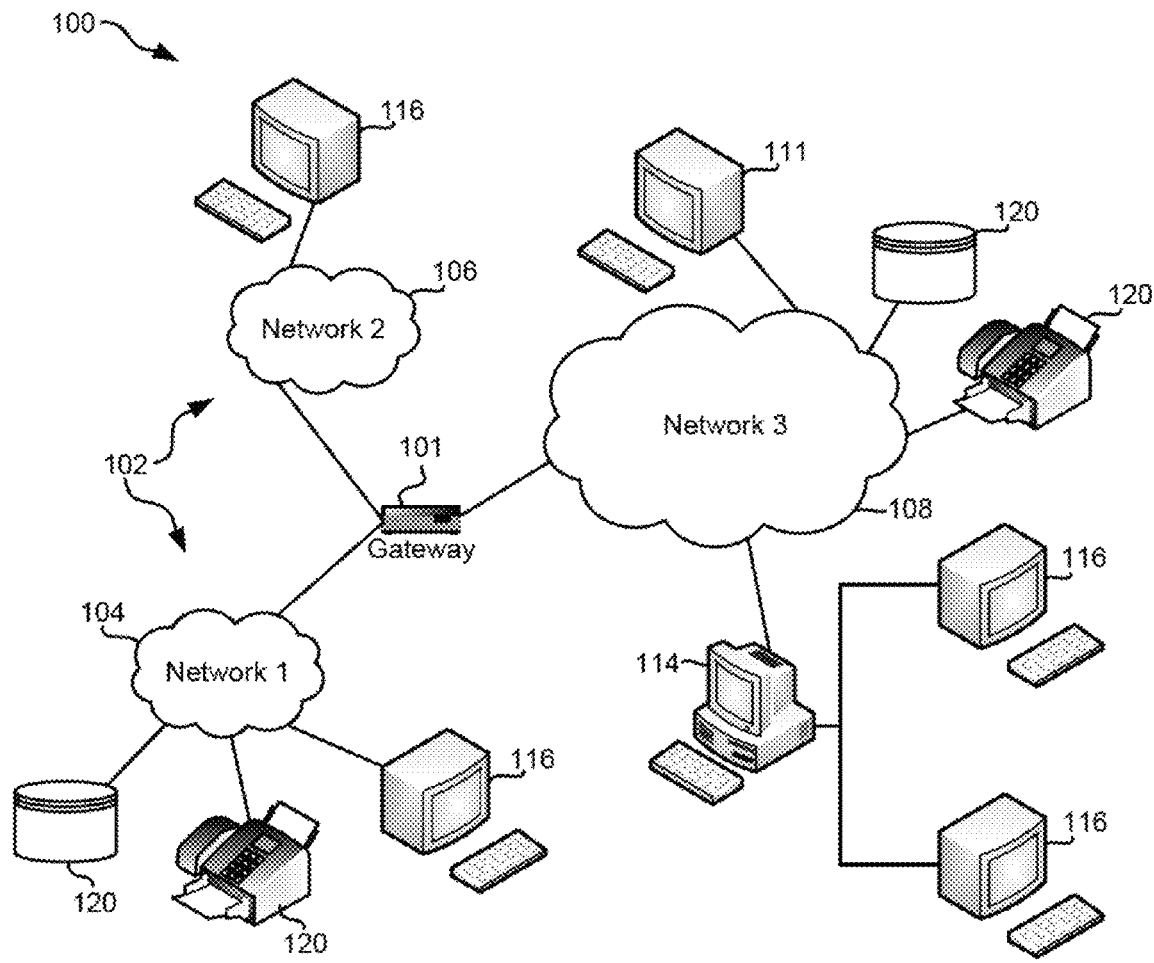
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, a default rule for learning an unknown media access control (MAC) address for a unicast packet may be implemented using a switch controller, such as an OpenFlow Controller (OFC), which communicates with an agent, such as an OpenFlow Agent (OFA), operating on the switch. The switch controller may maintain an extended MAC address table on behalf of the switch (whose native MAC address table may already be full) to instruct forwarding decisions to the switch thus avoiding broadcast floods in the network.

In one general embodiment, a system includes a processor, implemented in hardware, adapted for running a switch controller application, logic configured for detecting a switch in a network, logic configured for determining that the switch is capable of communicating via the switch controller application, and logic configured for overwriting a default rule for handling unknown unicast packets in the switch such that the switch sends any unknown unicast packet received by the switch to the system instead of flooding when an unknown unicast packet is received.

According to another general embodiment, a computer program product for handling unknown unicast packets includes a computer readable storage medium having computer readable program code embodied therewith, the computer readable program code including computer readable program code configured for detecting a switch in a network, computer readable program code configured for determining that the switch is capable of communicating via a switch controller application, and computer readable program code configured for overwriting a default rule for handling unknown unicast packets in the switch such that the switch sends any unknown unicast packet received by the switch to a switch controller instead of flooding when an unknown unicast packet is received, wherein the switch controller is capable of running the switch controller application and communicating with the switch.

In yet another general embodiment, a method for handling unknown unicast packets includes detecting a switch in a network that includes the switch and a switch controller, determining that the switch is capable of communicating via a switch controller application, and overwriting a default rule for handling unknown unicast packets in the switch such that the switch sends any unknown unicast packet received by the switch to the switch controller instead of flooding when an unknown unicast packet is received.

According to another general embodiment, a switch includes a processor, implemented in hardware, adapted for running an OpenFlow application, logic configured for allowing an OpenFlow controller to overwrite a default rule for handling unknown unicast packets in the switch such that the switch sends any unknown unicast packet received by the switch to the OpenFlow controller instead of flooding when an unknown unicast packet is received, logic configured for receiving an unknown unicast packet, logic configured for determining when a local media access control (MAC) address table is full, logic configured for learning a source MAC address associated with the packet when the local MAC address is not full, logic configured for preparing a source MAC ingress port association entry and sending the source MAC ingress port association entry to the OpenFlow controller when the local MAC address is full, logic configured for determining when a destination MAC address associated with the packet is in the local MAC address table, logic configured for forwarding the packet according to the destination MAC address when the destination MAC address associated with the packet is in the local MAC address table, and logic configured for either forwarding the packet according to a destination MAC address associated with the packet that is stored in the extended MAC address table or broadcasting the packet, wherein the destination MAC address associated with the packet that is stored in the extended MAC address table is received from the OpenFlow controller when an entry having the destination MAC address is in the extended MAC address table.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
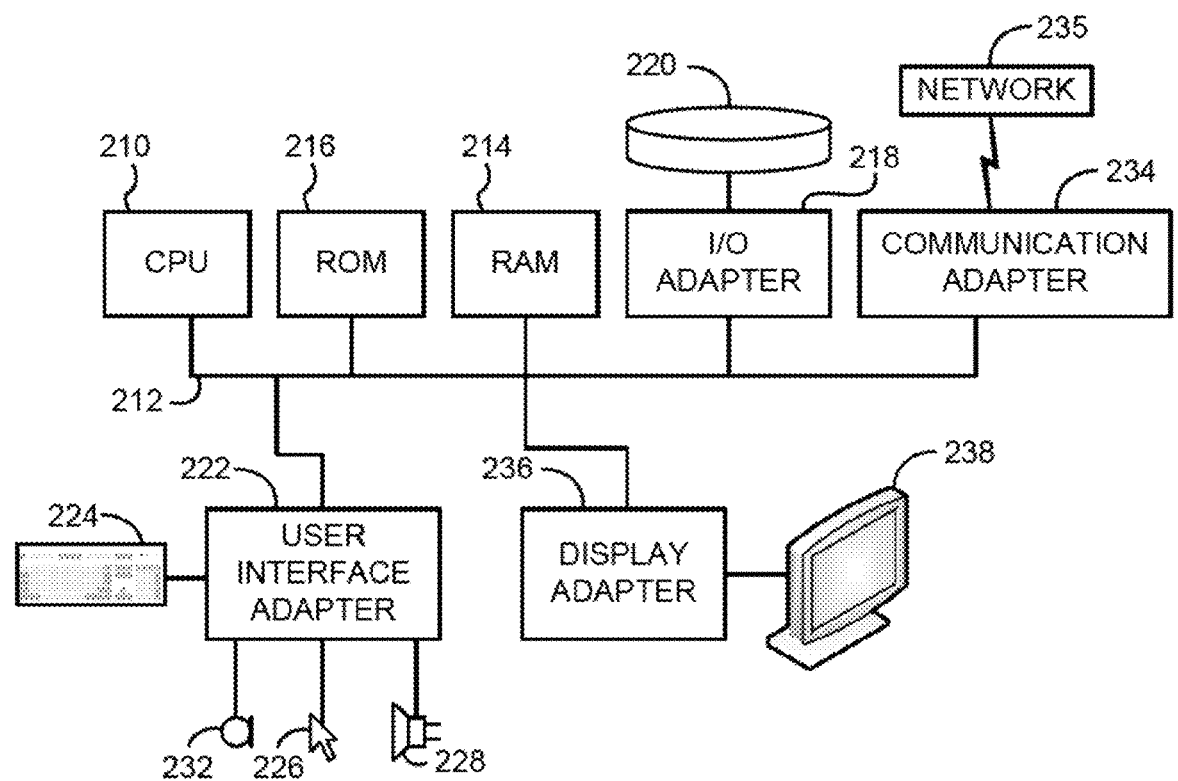
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3A:
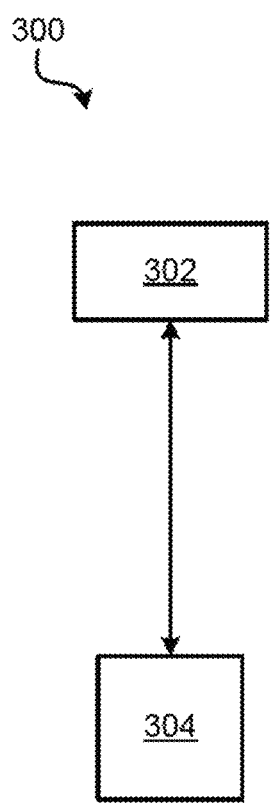
FIG. 3A shows a system, according to one embodiment.

Referring now to FIG. 3A, a system 300 is shown according to one embodiment. The system 300 includes a switch controller 302, such as an OFC, and a switch 304. The switch controller 302 is adapted for maintaining a page directory for each of the switches that have indicated an interest in special handling of unknown unicast packets. For the sake of this description, it is assumed that switch 304 has indicated an interest in special handling of unknown unicast packets. Each page directory entry is per switch and points to an extended MAC address to port number table maintained by the switch controller 302 for that particular switch.

Figure 3B:
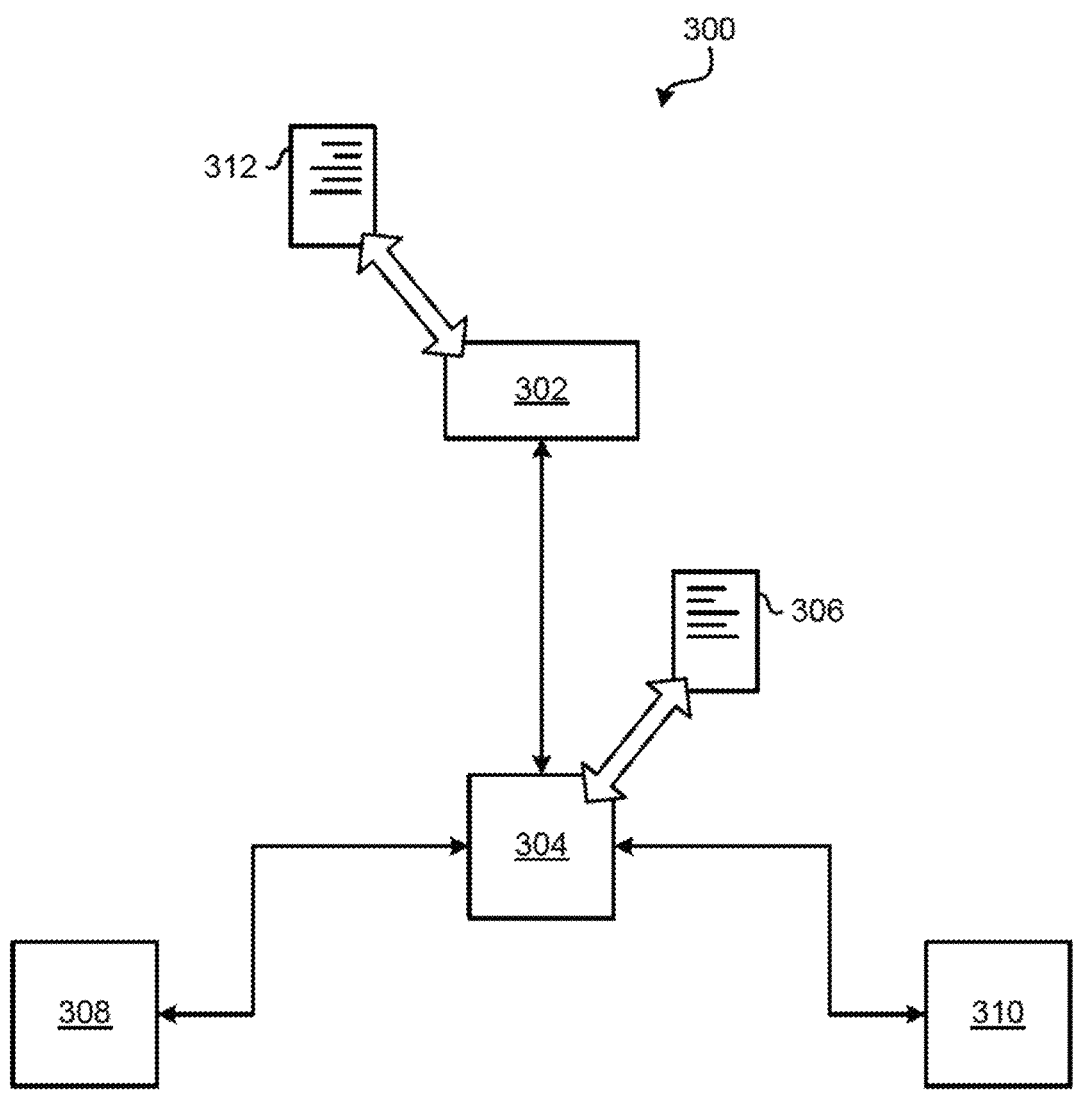
FIG. 3B shows a system, according to one embodiment.

As shown in FIG. 3B, when an unknown unicast packet is received by the switch 304 which has already filled its MAC address table 306, the switch 304 punts the packet to the switch controller 302 with ingress port information included. The switch controller 302 creates a MAC address table entry for the source device 308 designated in the packet in an extended MAC address table 312 and advises the switch 304 to send out a first broadcast to learn a destination address associated with the packet. When a destination device 310 (Which should receive the packet upon forwarding after learning its address) responds, the rule punts the response packet with additional ingress port information to the switch controller 302 where a MAC address table entry is created for the destination device 310. Then, the switch controller 302 refers to the previously created entry in the extended MAC address table 312 for the source device 308 to instruct the switch 304 about a forwarding decision regarding the received packet. This causes a unicast transmission on an egress port where the source device 308 is connected.

Any subsequent communication between the source device 308 and the destination device 310 requests switch controller 302 guidance, which results in unicast communication (and not the undesirable broadcast or flood). This continues until one or more entries in the switch's native MAC address table 306 age out, making space for new entries. At that time, the switch controller 302 synchronizes the extended MAC address table with the switch's MAC address table 306. Since the MAC addresses of the source and destination devices are now "learned" locally, the unknown unicast handling rule is no longer triggered when a packet is received indicating the destination device 310 as the destination address and egress decisions are made locally by the switch 304 itself.

Overall, what would have been sent as broadcast floods under a conventional default rule is instead limited to merely unicast transmissions, which saves significant fabric bandwidth over the time of session and provides for secure communication, since broadcasts are not sent to devices which potentially should not receive them due to privacy/permission settings.

Figure 4:
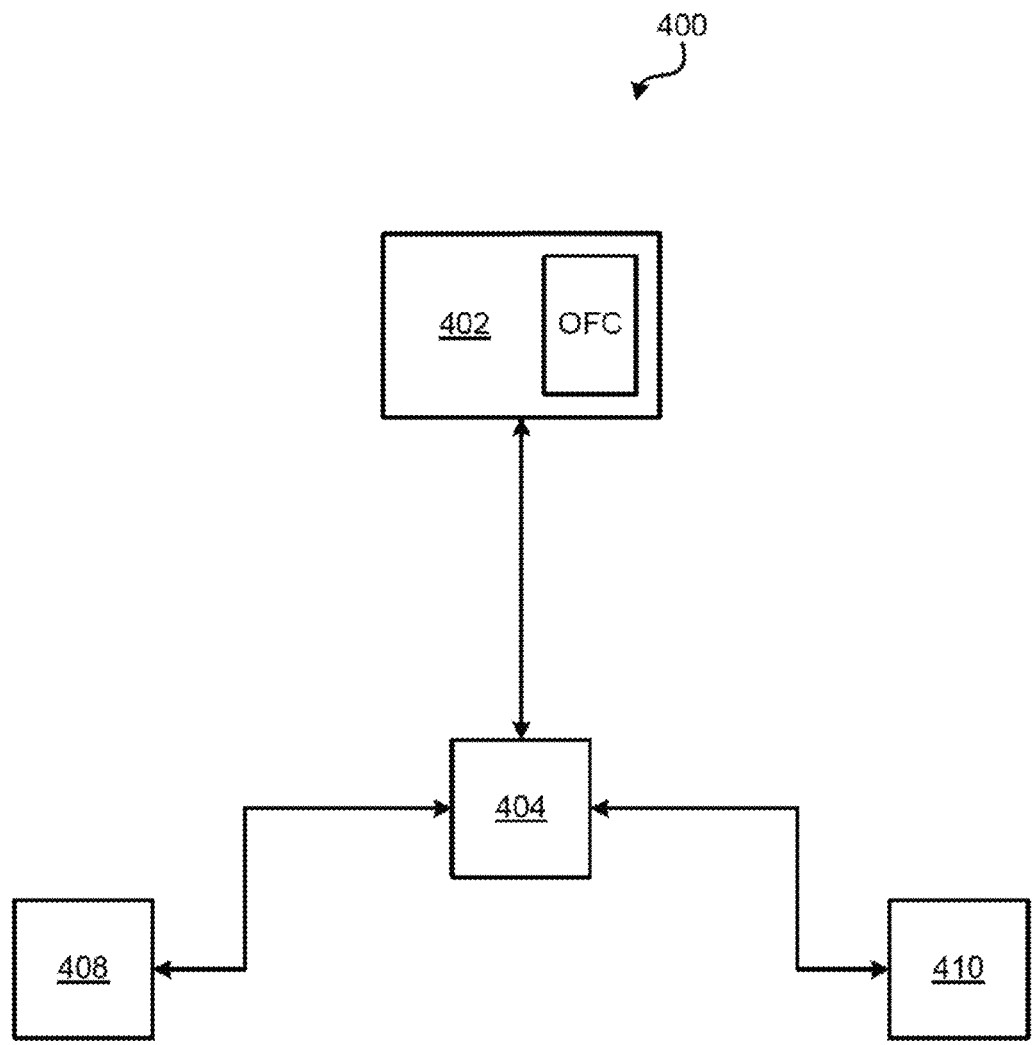
FIG. 4 shows a simplified diagram of a network using OpenFlow, according to one embodiment.

In one example, a network 400 comprises an OpenFlow-enabled Ethernet switch 404, a source device 408, a destination device 410, and a server 402 running OFC software. The server may run any suitable operating system, such as Windows Server, Linux, etc. The rules establishment, decision making sequences for forward and reverse paths, and MAC Address table synchronization are explained in more detail with reference to FIGS. 5-8, according to various embodiments, assuming the arrangement described in FIG. 4. Of course, the same descriptions may be applied to any arrangement, including those shown in FIGS. 3A-3B, and others.

The switch controller (server 402) may maintain extended MAC address tables for a plurality of devices, such as other switches and/or switching devices in the network 400, in accordance with more embodiments. Each extended MAC address table may be maintained separately for each device, for each WAN, for each separate virtual private network (VPN), per domain, etc., or may be included in a single extended MAC address table.

Figure 5:
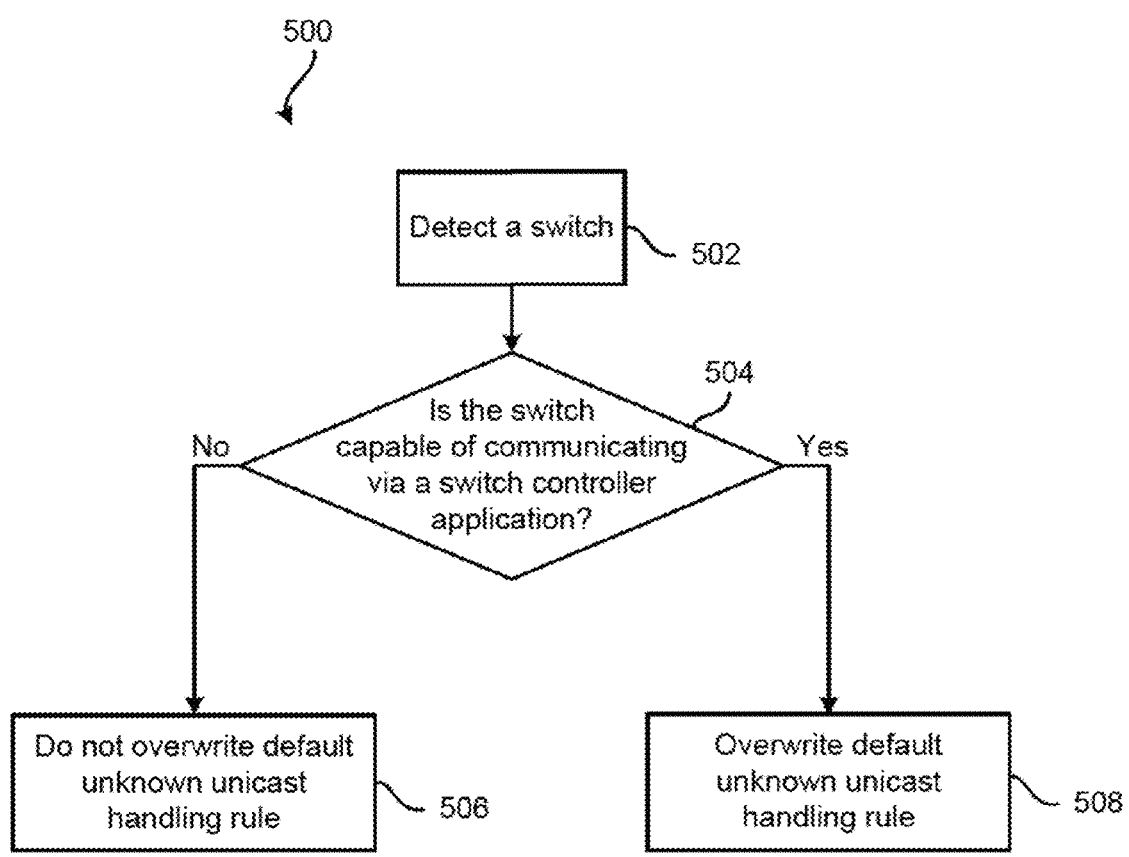
FIG. 5 is a flowchart of a method, according to one embodiment.

Now referring to FIG. 5, a flowchart of a method 500 for initializing a default rule in a switch is shown, according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, according to various embodiments, the method 500 may be partially or entirely performed by a switch, a source device, a destination device, and/or a server running OpenFlow software or some other switch controller.

As shown in FIG. 5, method 500 may initiate with operation 502, where a switch is detected. The switch may be detected using any method known in art, such as monitoring a heartbeat signal, initializing communications by sending out a request for response, receiving an indication of a switch being added, etc. This may also be referred to as a switch discovery operation, and may include any switch discovery technique known in the art.

In operation 504, it is determined if the switch is capable of communicating via a switch controller application, such a OpenFlow, which is adapted for modifying the behavior of network devices, such as switches, routers, gateways, etc. This determination may be made by sending a message in accordance with the switch controller application, and determining if the switch is capable of responding. In another approach, any switch that is capable of communicating via the switch controller application may indicate such compatibility when it responds to the message designed to detect the switch in operation 502.

In operation 506, when it is determined that the switch is not capable of communicating via the switch controller application, a default unknown unicast handling rule is not overwritten, e.g., the switch controller performs no further actions regarding the discovered switch.

In operation 508, when it is determined that the switch is capable of communicating via the switch controller application, the default unknown unicast handling rule is overwritten such that the switch controller is sent any unknown unicast packet received by the switch instead of having the switch flood when an unknown unicast packet is received, e.g., the unknown unicast packet is sent to the switch controller which may then perform additional operations regarding the unknown unicast packet.

Figure 6:
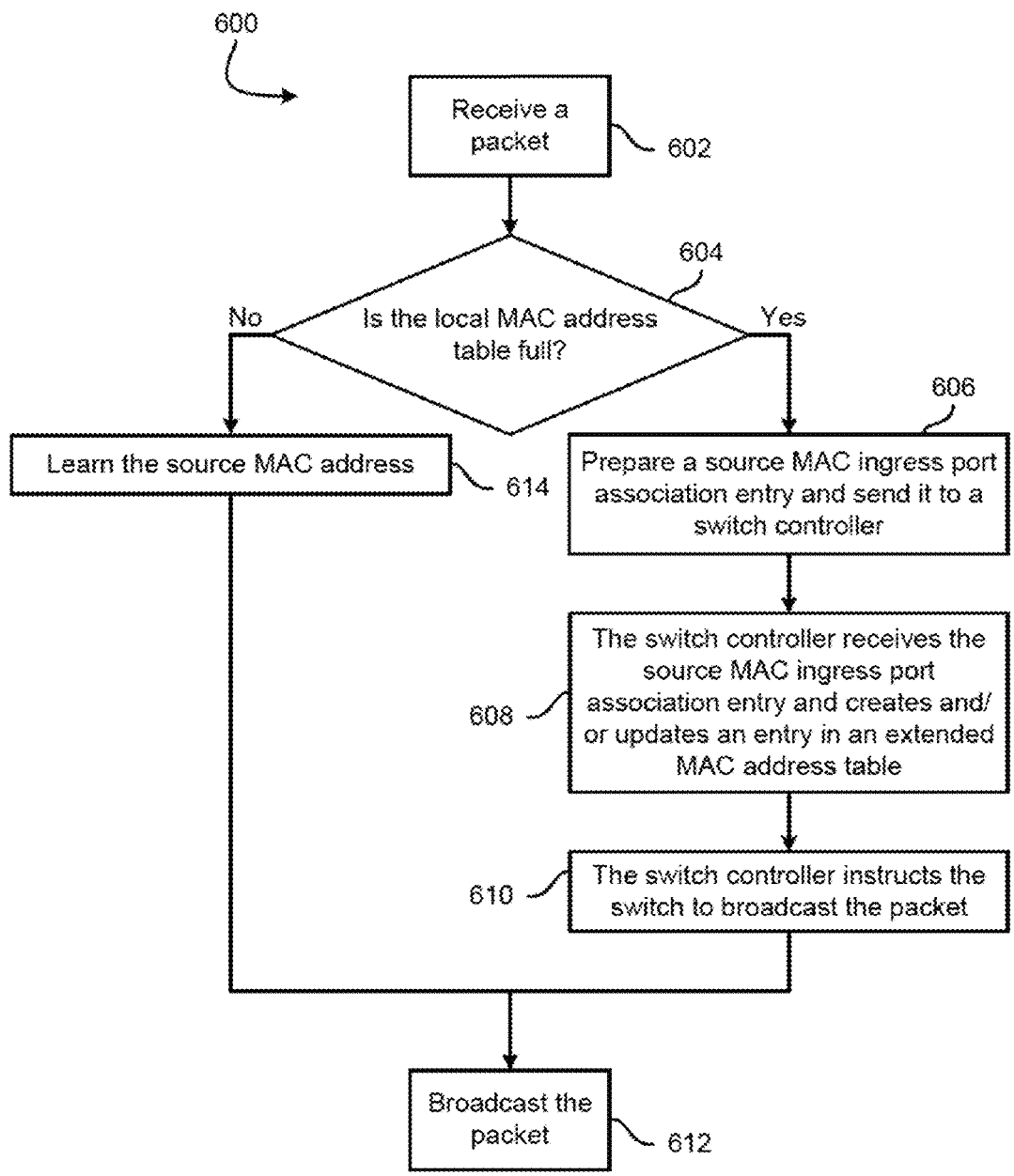
FIG. 6 is a flowchart of a method, according to another embodiment.

Now referring to FIG. 6, a flowchart of a method 600 for responding to a packet is shown, according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, according to various embodiments, the method 600 may be partially or entirely performed by a switch, a source device, a destination device, and/or a server running Open-Flow software or some other switch controller.

As shown in FIG. 6, method 600 may initiate with operation 602, where a packet is received. For the sake of these descriptions, it is assumed that the packet is an unknown unicast packet. If it is a multicast packet, then method 600 may terminate after operation 602.

The packet may be received at any device, and for the sake of these descriptions, it is assumed that the packet is received at a switch. However, any other device capable of receiving network traffic may receive the packet and method 600 may be implemented therewith.

In operation 604, it is determined if a local MAC address table is full, e.g., if there is any space in the table local to the switch to add another entry for another device's MAC address, then the table is not full.

In operation 606, when the MAC address table is full, a source MAC ingress port association entry is prepared and sent to a switch controller. The association denotes the relationship between the ingress port on which the packet was received and the source MAC address indicated in the packet (possibly in a header of the packet).

In operation 608, the switch controller receives the source MAC ingress port association entry and creates and/or updates an entry in an extended MAC address table stored on the switch controller or otherwise accessible to the switch controller.

In operation 610, the switch controller instructs the switch to broadcast the packet.

In operation 612, the switch broadcasts the packet. This is performed in order to determine a destination address for the packet.

If the extended MAC address table stored on the switch controller already included the source MAC ingress port association entry, e.g., the switch controller merely updated the entry in operation 608, then the switch controller sends back the destination address for the switch to use to send out a unicast packet to its intended destination instead of broadcasting the packet, as indicated in operation 612.

In operation 614, when the local MAC address table is not full, the source MAC address indicated in the packet is learned by the switch which received the packet.

Figure 7:
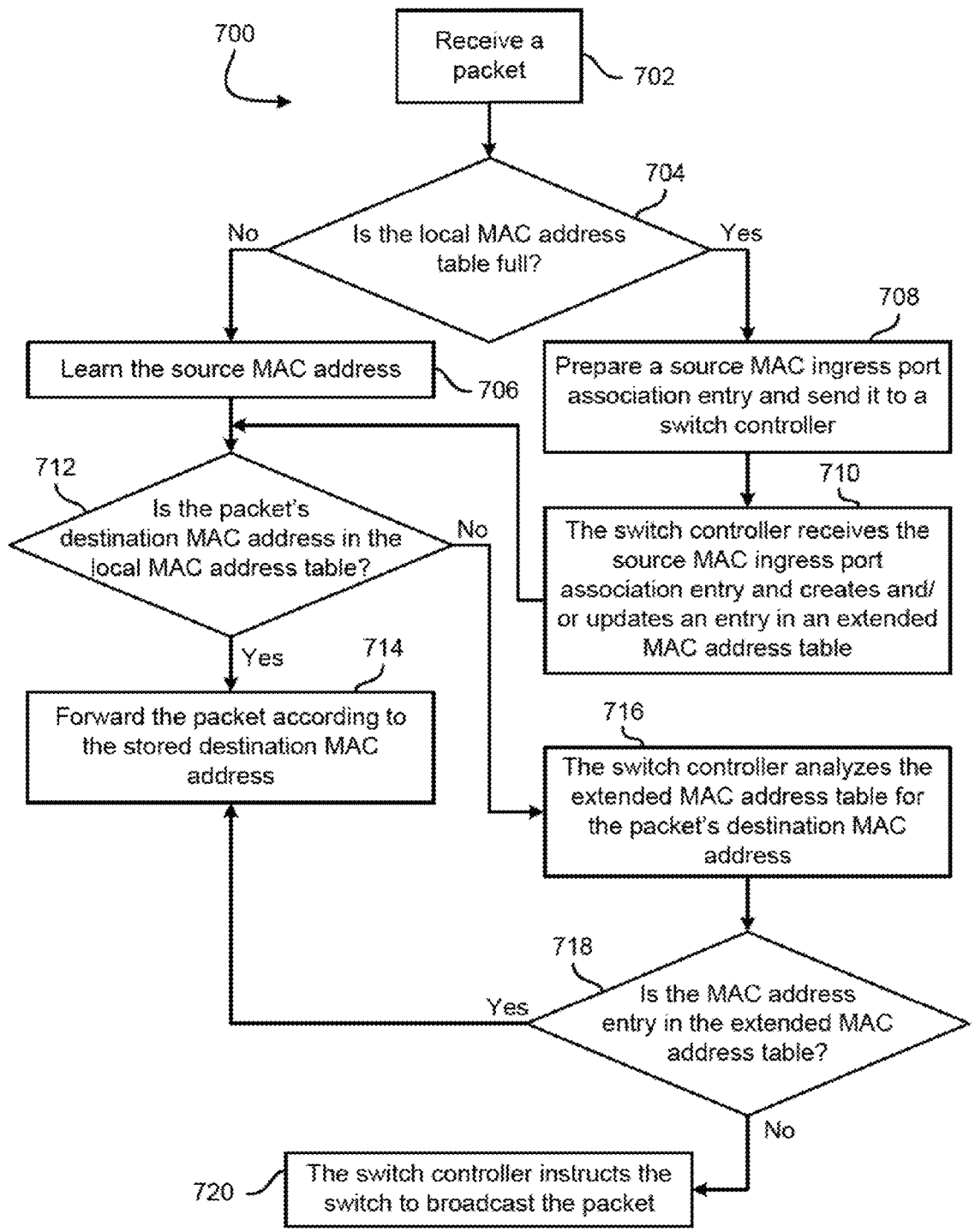
FIG. 7 is a flowchart of a method, according to yet another embodiment.

Now referring to FIG. 7, a flowchart of a method 700 for responding to packet is shown, according to one embodiment. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, according to various embodiments, the method 700 may be partially or entirely performed by a switch, a source device, a destination device, and/or a server running OFC software or some other switch controller.

As shown in FIG. 7, method 700 may initiate with operation 702, where a packet is received. For the sake of these descriptions, it is assumed that the packet is an unknown unicast packet. If it is a multicast packet, then method 700 may terminate after operation 702.

The packet may be received at any device, and for the sake of these descriptions, it is assumed that the packet is received at a switch. However, any other device capable of receiving network traffic may receive the packet and method 700 may be implemented therewith.

In operation 704, it is determined if a local MAC address table is full, e.g., if there is any space in the table local to the switch to add another entry for another device's MAC address, then the table is not full.

In operation 706, when the local MAC address table is not full, the source MAC address indicated in the packet is learned by the switch which received the packet.

In operation 708, when the MAC address table is full, a source MAC ingress port association entry is prepared and sent to a switch controller. The association denotes the relationship between the ingress port on which the packet was received and the source MAC address indicated in the packet (possibly in a header of the packet).

In operation 710, the switch controller receives the source MAC ingress port association entry and creates and/or updates an entry in an extended MAC address table stored on the switch controller or otherwise accessible to the switch controller.

In operation 712, it is determined if the packet's destination MAC address is stored in the local MAC address table.

In operation 714, when the destination MAC address is in the local MAC address table, the switch forwards the packet according to the stored destination MAC address.

In operation 716, when the destination MAC address is not stored in the local MAC address table, the switch controller analyzes the extended MAC address table stored on the switch controller or otherwise accessible to the switch controller for the packet's destination MAC address.

In operation 718, when the destination MAC address entry is found in the extended MAC address table, the switch controller responds to the switch with egress port forwarding information, and the method 700 continues on to operation 714.

In operation 720, when the destination MAC address entry is not found in the extended MAC address table, the switch controller instructs the switch to broadcast the packet in order to determine a destination MAC address for the packet.

Figure 8:
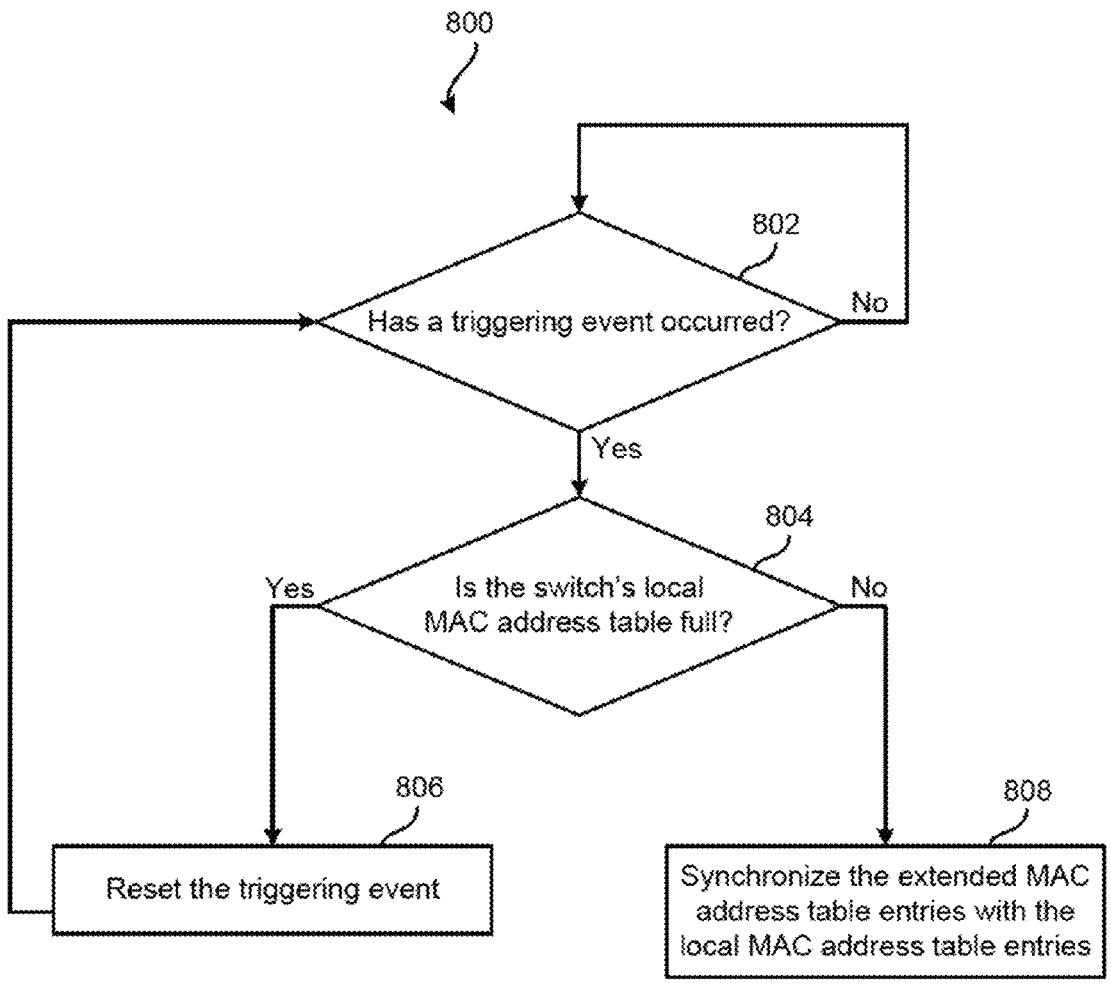
FIG. 8 is a flowchart of a method, in accordance with another embodiment.

Now referring to FIG. 8, a flowchart of a method 800 for synchronizing MAC address tables is shown, according to one embodiment. The method 800 may be performed in accordance with the present invention in any of the environments depicted in FIGS. 1-4, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, according to various embodiments, the method 800 may be partially or entirely performed by a switch, a source device, a destination device, and/or a server running Open-Flow software or some other switch controller.

As shown in FIG. 8, method 800 may initiate with operation 802, where it is determined if a triggering event has occurred. In one embodiment, the triggering event may be a synchronization interval timing out. In another embodiment, the triggering event may be the expiration of a synchronization timer. Other triggering events may be used as well, as would be understood by one of skill in the art.

In operation 804, when the triggering event has occurred, it is determined if a switch's local MAC address table is full, e.g., if there is any space in the table local to the switch to add another entry for another device's MAC address, then the table is not full.

In operation 806, when the local MAC address table is full, the triggering event is reset such that it may be triggered again. For example, when the triggering event is a timer, the timer is reset. In another example, when the triggering event is a synchronization interval, the interval period is reset to the beginning.

In operation 808, when the local MAC address table is not full, an extended MAC address table on the switch controller is synchronized with the local MAC address table on the switch, e.g., entries in the extended MAC address table are imported into the local MAC address able to the extent possible, with the most useful entries being imported first. Useful entries may be determined using any method known in the art as first in, last in, most used, most important, etc.

As shown in FIGS. 5-8, any of methods 500-800, according to various embodiments, may be implemented in systems and/or computer program products.

According to one embodiment, a switch may comprise a processor, implemented in hardware or software in various embodiments. The processor may be adapted for executing logic and running an OpenFlow application or some other switch controller application. According to various embodiments, any or all of the following logic may be included in the switch: logic configured for allowing a switch controller, such as an OpenFlow controller, to overwrite a default rule for handling unknown unicast packets in the switch such that the switch sends any unknown unicast packet received by the switch to the OpenFlow controller instead of flooding when an unknown unicast packet is received, logic configured for receiving an unknown unicast packet, logic configured for determining when a local MAC address table is full, logic configured for learning a source MAC address associated with the packet when the local MAC address is not full, logic configured for preparing a source MAC ingress port association entry and sending the source MAC ingress port association entry to the switch controller when the local MAC address is full, logic configured for determining when a destination MAC address associated with the packet is in the local MAC address table, logic configured for forwarding the packet according to the destination MAC address when the destination MAC address associated with the packet is in the local MAC address table, and logic configured for either forwarding the packet according to a destination MAC address associated with the packet that is stored in the extended MAC address table or broadcasting the packet. The destination MAC address associated with the packet that is stored in the extended MAC address table is received from the switch controller when an entry having the destination MAC address is in the extended MAC address table.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a processor, implemented in hardware, configured to run a set of instructions of a switch controller application and execute logic, the logic being configured to:
detect a switch in a network;
determine that the switch is capable of communicating via the switch controller application;
overwrite a default rule for handling unknown unicast packets in the switch such that the switch sends any unknown unicast packet received by the switch to the system;
determine that expiration of a synchronization timer has occurred;
determine that a local media access control (MAC) address table located on the switch is not full, in response to expiration of the synchronization timer; and
synchronize an extended MAC address table accessible to the system with the local MAC address table located on the switch, in response to determining that the local MAC table is not full, wherein the logic configured to synchronize the extended MAC address table with the local MAC address table comprises logic configured to import entries from the extended MAC address table into the local MAC address table until the local MAC address table is full, and wherein the logic configured to import the entries comprises logic configured to import entries determined to be more often used before entries determined to be less often used.

2. The system as recited in claim 1, wherein the switch controller application adheres to OpenFlow.

3. The system as recited in claim 1, wherein the logic is further configured to:
receive a source media access control (MAC) ingress port association entry from the switch, wherein the ingress port relates to an unknown unicast packet received at the switch; and
create or update an entry in an extended MAC address table with information included in the source MAC ingress port association entry.

4. The system as recited in claim 3, wherein the logic is further configured to:
determine that a destination MAC address of the packet is in a local MAC address table located on the switch; and
instruct the switch to forward the packet according to the destination MAC address stored in the local MAC address table.

5. The system as recited in claim 3, wherein the logic is further configured to:
determine that a destination MAC address of the packet is not in a local MAC address table located on the switch;
determine that the destination MAC address of the packet is in the extended MAC address table; and
instruct the switch to forward the packet according to the destination MAC address stored in the extended MAC address table.

6. The system as recited in claim 3, wherein the logic is further configured to:
- determine that a destination MAC address of the packet is not in a local MAC address table located on the switch;
- determine that a destination MAC address of the packet is not in the extended MAC address table; and
- instruct the switch to broadcast the packet.

7. A computer program product for handling unknown unicast packets, the computer program product comprising a computer readable storage medium having computer readable program code embodied therewith, the embodied computer readable program code comprising:
- computer readable program code configured for detecting a switch in a network;
- computer readable program code configured for determining that the switch is capable of communicating via a switch controller application;
- computer readable program code configured for overwriting a default rule for handling unknown unicast packets in the switch such that the switch sends any unknown unicast packet received by the switch to a switch controller, wherein the switch controller is capable of running the switch controller application and communicating with the switch;
- computer readable program code configured for determining that expiration of a synchronization timer has occurred;
- computer readable program code configured for determining that a local media access control (MAC) address table located on the switch is not full, in response to expiration of the synchronization timer; and
- computer readable program code configured for synchronizing an extended MAC address table accessible to the switch controller with the local MAC address table located on the switch, in response to a determination that the local MAC table is not full, the synchronizing comprising importing entries from the extended MAC address table into the local MAC address table, the importing comprising importing entries determined to be more often used before entries determined to be less often used.

8. The computer program product as recited in claim 7, wherein the switch controller application adheres to OpenFlow.

9. The computer program product as recited in claim 7, the embodied computer readable program code further comprising:
- computer readable program code configured for receiving a source media access control (MAC) ingress port association entry from the switch, wherein the ingress port relates to an unknown unicast packet received at the switch; and
- computer readable program code configured for creating or updating an entry in an extended MAC address table with information included in the source MAC ingress port association entry.

10. The computer program product as recited in claim 9, the embodied computer readable program code further comprising:
- computer readable program code configured for determining that a destination MAC address of the packet is in a local MAC address table located on the switch; and
- computer readable program code configured for instructing the switch to forward the packet according to the destination MAC address stored in the local MAC address table.

11. The computer program product as recited in claim 9, the embodied computer readable program code further comprising:
- computer readable program code configured for determining that a destination MAC address of the packet is not in a local MAC address table located on the switch;
- computer readable program code configured for determining that the destination MAC address of the packet is in the extended MAC address table; and
- computer readable program code configured for instructing the switch to forward the packet according to the destination MAC address stored in the extended MAC address table.

12. The computer program product as recited in claim 9, the embodied computer readable program code further comprising:
- computer readable program code configured for determining that a destination MAC address of the packet is not in a local MAC address table located on the switch;
- computer readable program code configured for determining that a destination MAC address of the packet is not in the extended MAC address table; and
- computer readable program code configured for instructing the switch to broadcast the packet.

13. A method for handling unknown unicast packets, the method comprising:
- detecting, a switch controller, a switch in a network, the network comprising the switch and the switch controller;
- determining, the switch controller, that the switch is capable of communicating via a switch controller application; and
- overwriting, the switch controller, a default rule for handling unknown unicast packets in the switch such that the switch sends any unknown unicast packet received by the switch to the switch controller;
- determining, using the switch controller, that expiration of a synchronization timer has occurred;
- determining, using the switch controller, that a local media access control (MAC) address table located on the switch is not full, in response to expiration of the synchronization timer; and
- synchronizing, using the switch controller, an extended MAC address table accessible to the switch controller with the local MAC address table located on the switch, in response to the determination that the local MAC table is not full, the synchronization comprising importing entries from the extended MAC address table into the local MAC address table, the importing comprising importing entries determined to be more often used before entries determined to be less often used.

14. The method as recited in claim 13, wherein the switch controller application adheres to OpenFlow.

15. The method as recited in claim 13, further comprising:
- receiving a source media access control (MAC) ingress port association entry from the switch, wherein the ingress port relates to an unknown unicast packet received at the switch; and
- creating or updating an entry in an extended MAC address table with information included in the source MAC ingress port association entry, wherein the extended MAC address table is accessible to the switch controller.

16. The method as recited in claim 15, further comprising:
- determining that a destination MAC address of the packet is in a local MAC address table located on the switch; and instructing the switch to forward the packet according to the destination MAC address stored in the local MAC address table.

17. The method as recited in claim 15, further comprising:
determining that a destination MAC address of the packet is not in a local MAC address table located on the switch;
determining that the destination MAC address of the packet is in the extended MAC address table; and
instructing the switch to forward the packet according to the destination MAC address stored in the extended MAC address table.

18. The method as recited in claim 15, further comprising:
determining that a destination MAC address of the packet is not in a local MAC address table located on the switch;
determining that a destination MAC address of the packet is not in the extended MAC address table; and
instructing the switch to broadcast the packet.

19. A switch, comprising:
a processor, implemented in hardware, configured to run a set of instructions of an OpenFlow application;
logic configured for allowing an OpenFlow controller to overwrite a default rule for handling unknown unicast packets in the switch such that the switch sends any unknown unicast packet received by the switch to the OpenFlow controller;
logic configured for receiving an unknown unicast packet;
logic configured for determining whether a local media access control (MAC) address table is full;
logic configured for learning a source MAC address associated with the packet in response to a determination that the local MAC address table is not full, and storing the learned source MAC address associated with the packet in the local MAC address table;
logic configured for preparing a source MAC ingress port association entry and sending the source MAC ingress port association entry to the OpenFlow controller, in response to a determination that the local MAC address table is full;
logic configured for determining whether a destination MAC address associated with the packet is in the local MAC address table;
logic configured for forwarding the packet according to the destination MAC address, in response to a determination that the destination MAC address associated with the packet is in the local MAC address table;
logic configured for receiving a destination MAC address from the OpenFlow controller, in response to a determination that the destination MAC address associated with the packet is stored in an extended MAC address table of the OpenFlow controller;
logic configured for forwarding the packet according to the destination MAC address received from the OpenFlow controller or broadcasting the packet, in response to a determination that the destination MAC address is not received from the OpenFlow controller;
logic configured for determining that expiration of a synchronization timer has occurred; and
logic configured for synchronizing the extended MAC address table of the OpenFlow controller with the local MAC address table, in response to expiration of the synchronization timer, the logic configured for synchronizing comprising logic configured for importing entries from the extended MAC address table into the local MAC address table, the logic configured for importing the entries comprising logic configured to import entries determined to be more often used before entries determined to be less often used.

* * * * *